No. 715,043. Patented Dec. 2, 1902.
R. A. FESSENDEN.
CURRENT OPERATED RECEIVER FOR ELECTROMAGNETIC WAVES.
(Application filed Aug. 27, 1902.)

(No Model.) 2 Sheets—Sheet 2.

WITNESSES:
Herbert Bradley.
Fred Kirchner.

INVENTOR
Reginald A. Fessenden
by Darwin S. Wolcott Att'y.

UNITED STATES PATENT OFFICE.

REGINALD A. FESSENDEN, OF MANTEO, NORTH CAROLINA.

CURRENT-OPERATED RECEIVER FOR ELECTROMAGNETIC WAVES.

SPECIFICATION forming part of Letters Patent No. 715,043, dated December 2, 1902.

Application filed August 27, 1902. Serial No. 121,170. (No model.)

*To all whom it may concern:*

Be it known that I, REGINALD A. FESSENDEN, a citizen of the United States, residing at Manteo, in the county of Dare and State of North Carolina, have invented or discovered certain new and useful Improvements in Current-Operated Receivers for Electromagnetic Waves, of which improvements the following is a specification.

The invention described herein relates to certain improvements in receivers operative by currents produced by electromagnetic waves, and has for its object the production of a constantly-rotating magnetic field and the changing of direction of the field without changing the amount of the magnetic lines—*i. e.*, without producing a magnetizing or demagnetizing effect.

The invention is hereinafter more fully described and claimed.

Figure 1:
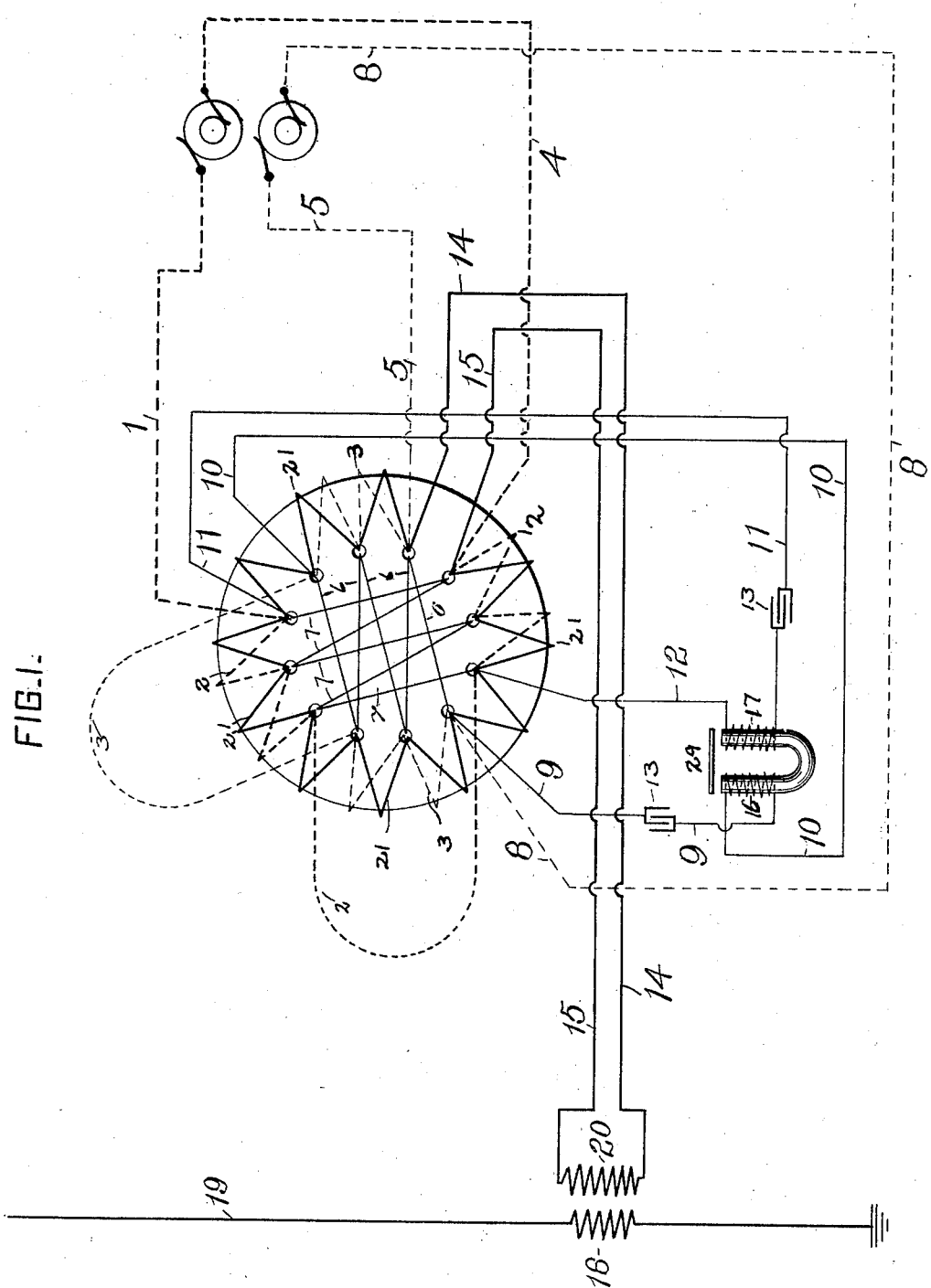
Figure 2:
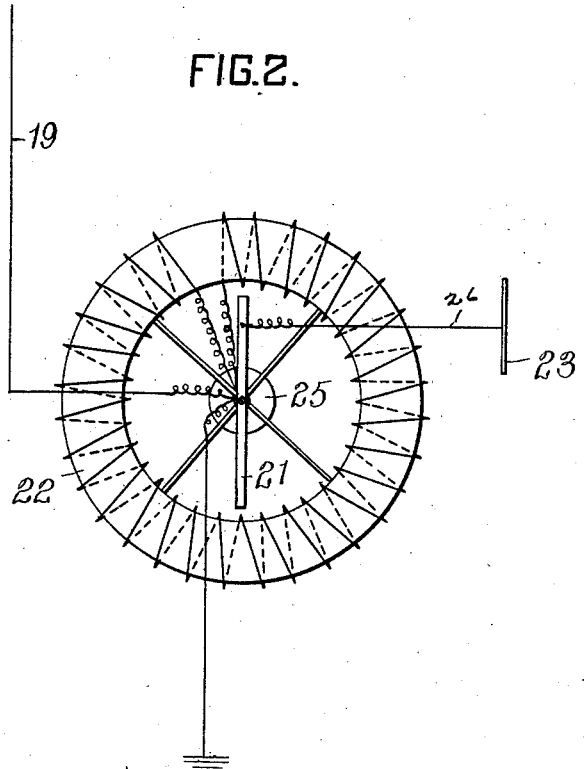
Figure 3:
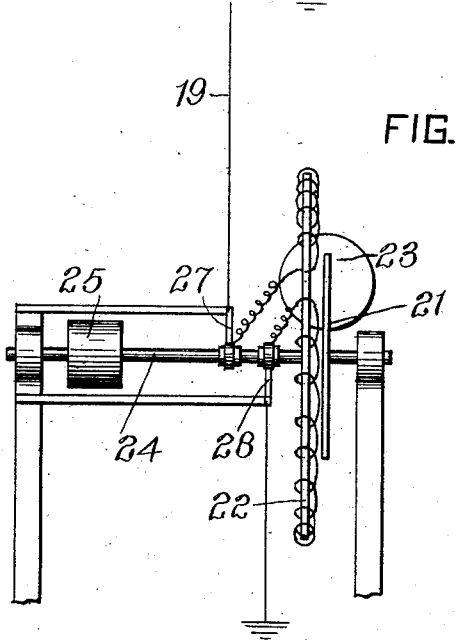

In Figure 1 of the accompanying drawings my improvement is shown diagrammatically. Figs. 2 and 3 illustrate front and side views of a modified form of receiver.

In the practice of my invention I employ a magnetic circuit which may be closed, as shown, and may be formed of soft iron, although other magnetic material (as hard iron or nickel) may be employed. The metal forming the magnetic circuit may be kept under mechanical strain, as by clamping the periphery and forcing the middle portion of the disk outwardly, or vice versa, thereby producing an increased magnetic instability. The magnetic field is produced by a two, three, or poly phase generator of suitable construction. In the arrangement shown one of the windings 2 forms part of the circuit 1 4, so connected to the generator that a current of one phase is produced therein, while the other winding 3 is included in the circuit 5 8, in which a current of a different phase is generated. The windings 6 and 7 form parts of circuits 9 10 and 11 12, respectively, which also include an electromagnetic indicator 29, as a telephone, galvanometer, siphon-recorder, &c. It is preferred that the circuits 9 10 and 11 12 should each include a separate independent coil or winding 16 17, although both circuits may be connected in series with a single coil, so as to operate analogously to the case of a drum-wound alternating-current armature. It is preferred to arrange condensers 13, of small capacity, in the indicating-circuits 9 10 and 11 12 to cut out currents due to the rotation of the magnetic field, but permit the passage of currents caused by the sudden change of direction of the field by currents produced by electromagnetic waves.

The winding 21 is included in a circuit 14 15, which also includes the secondary 20 of a transformer, the primary 18 of the transformer being connected in series with the receiving-conductor 19. The circuit including the secondary of the transformer is preferably tuned to the period of the electromagnetic waves, preferably by proportioning the secondary circuit.

The field caused by the two or more phase currents from the generator revolves constantly and uniformly, the currents being produced in such manner that they shall have, as nearly as may be convenient, a sine form, and thereby cause the field to revolve without abrupt changes in direction and to be maintained at uniform strength.

On the passage of a rapidly-alternating current caused by the electromagnetic waves through the circuit 14 15 the lag of the direction of the magnetic lines behind the magnetic field is reduced suddenly—*i. e.*, the lag of the direction of the magnetic induction of the magnetic flux or the direction of the magnetomotive force is suddenly reduced. It is assumed that this is due to the rapidly-alternating currents produced by the electromagnetic waves, causing rapid vibrations of the magnetic molecular chains, thus causing the molecular magnets to adjust themselves better to the direction of the rotating magnetic force, and therefore not to lag behind so great a distance. This sudden shifting in direction of the magnetic flux would not cause any voltage in a circuit which entirely inclosed the magnetic flux. For example, a magnetized iron bar having a coil of wire wound on it may be moved in any direction without the change of direction of the lines, producing any voltage in the coil, and to obtain a voltage in the coil it is necessary to magnetize or demagnetize the iron core; but in the present case the relative positions of the magnetic flux and the circuits 9 10 and 11 12 are continually changing, and any change in direction of the magnetic flux will produce a voltage in one or both of the circuits, though the total amount of the magnetic flux remains unchanged.

The positions of the circuits are to some extent interchangeable. For example, the circuits 9 10 and 11 12 may be used instead of the circuits 1 4 and 5 8 to produce the rotating field, and vice versa. Also any of these circuits may be connected in operative relation to the receiving-conductor and used to produce the magnetic variations, and thus the electromagnetic vibrations may be superimposed on any of the circuits while operating normally for its primary purpose. It is characteristic of this form of magnetic receiver that the magnetic flux is not changed as to amount, but only as to direction. In this it is differentiated from other forms of magnetic receivers, such as those used heretofore, in which the amount of the magnetic flux is changed, but not its direction.

In the form of receiver herein described a slowly-rotating magnetic field produces a slowly-rotating magnetic flux. Field and flux are constant in amount; but the flux normally lags behind the field. On the receipt of signal-waves and the passage of currents thereby produced through the receiving-coils the amount of this lag is reduced without, however, changing the amount of said field or said flux, and said variation in lag between the direction of the flux and the field generates a voltage which is used to produce an indication.

Change of direction has marked advantages over change of amount in that it requires much less energy to produce a given effect by changing the direction than it does by changing the amount and permits of the use of a short closed magnetic circuit for the highly-oscillatory currents.

Instead of a closed-circuit rotating field an open circuit may be used, as shown in Figs. 2 and 3. As shown therein, I employ a permanent magnet 21 and an annular disk 22, one of said parts being rotated, while the other is held stationary as against movement in the direction of movement of the other part. The circuit carrying the highly-oscillating current produced by the electromagnetic waves is wound around the annular disk. A diaphragm 23 is connected to the non-driven part or member, on which a magnetic drag is exerted by the driven part, keeping the diaphragm under tension in one direction. When a highly-oscillating current passes around the ring or annular disk, the direction of the magnetic flux is shifted in the manner described, and thus the drag on the part held by the diaphragm is relieved, permitting it to vibrate. In the construction shown the annular disk 22 is secured to a shaft 24, driven by any suitable means, as the clockwork 25. The permanent magnet 21 is loosely mounted on the shaft in operative relation to the disk. The magnet is held from rotation with the disk by the diaphragm 23, to which the magnet is connected by a wire 26. The vertical wire 19 is connected to the coil on the disk by a brush 27, and the opposite end of the coil is connected to ground through the brush 28. As the disk is driven it will exert a magnetic drag or pull on the magnet 21, which in turn will pull on the diaphragm. When a highly-oscillating current passes through the coil on the disk, the direction of the magnetic lines will be changed, the drag on the diaphragm will be relieved, and the latter will vibrate.

I claim herein as my invention—

1. In a system for signaling by electromagnetic waves, the combination at the receiving-station of a magnetic circuit, means for producing a magnetic flux in said circuit, and means operative by currents produced by electromagnetic waves to change the direction of the flux, substantially as set forth.

2. In a system for signaling by electromagnetic waves, the combination at the receiving-station of a magnetic circuit, means for producing in said circuit a magnetic flux practically constant in amount and normally varying in direction with practical uniformity, and means operative by electromagnetic waves for changing the direction of the magnetic flux, substantially as set forth.

3. In a system for signaling by electromagnetic waves, the combination of a rotating magnetic field, means for producing a rotating magnetic flux, and means operative by currents produced by electromagnetic waves for changing the angle between the direction of the field and that of the flux, substantially as set forth.

4. In a system for signaling by electromagnetic waves, the combination at the receiving-station of a magnetic circuit, means for producing a magnetic flux in said circuit, means operative by currents produced by electromagnetic waves to change the direction of the flux, and a circuit adapted to be energized by such change of direction of the flux, substantially as set forth.

5. In a system for signaling by electromagnetic waves, the combination of a rotating magnetic field, means for producing a rotating magnetic flux, means operative by currents produced by electromagnetic waves for changing the angle between the direction of the field and that of the flux, and a circuit adapted to be energized by such change of angle between the field and flux, substantially as set forth.

6. In a system for signaling by electromagnetic waves, the combination at the receiving-station of a magnetic circuit, means for producing a magnetic flux in said circuit, means operative by currents produced by electromagnetic waves to change the direction of the flux, and a circuit adapted to be energized by such change of direction of the flux, said circuit being arranged so as to be energized by the change of direction of the flux but not by the normal rotations of the flux, substantially as set forth.

7. In a system of signaling by electromagnetic waves, the combination at the receiving-station of a magnetic circuit, means for producing in said circuit a magnetic flux practically constant in amount and normally varying in direction with practical uniformity, means operative by electromagnetic waves for changing the direction of the magnetic flux, and means for mechanically producing an indication by said change in direction of flux, substantially as set forth.

8. In a system for signaling by electromagnetic waves, the combination at the receiving-station of a magnetic circuit, means for producing a magnetic flux in said circuit, and means operative by currents produced by electromagnetic waves to change the position of the flux, substantially as set forth.

9. In a system of signaling by electromagnetic waves, the combination at the receiving-station of a magnetic circuit, means for producing in said circuit a magnetic flux practically constant in motion and normally varying in position with practical uniformity, and means operative by the electromagnetic waves for changing the position of the magnetic flux, substantially as set forth.

10. In a system of signaling by electromagnetic waves, the combination at the receiving-station of a magnetic circuit, means for producing a magnetic flux in said circuit, means operative by currents produced by electromagnetic waves to change the position of the flux and a circuit adapted to be energized by such change of position of the flux, substantially as set forth.

In testimony whereof I have hereunto set my hand.

REGINALD A. FESSENDEN.

Witnesses:
GEO. B. BLEMING,
BAYARD H. CHRISTY.